2,917,535
PROCESS FOR PRODUCING GLYCOL DICARBAMATES

Edgar C. Britton and John E. Livak, Midland, Mich., assignors to The Dow Chemical Company, Midland, Mich., a corporation of Delaware No Drawing. Application November 15, 1956
Serial No. 622,280

9 Claims. (Cl. 260—482)

This invention relates to processes for the manufacture of glycol dicarbamates, and in particular, to improvements in the process of making such carbamates by the reaction of glycols with methyl carbamate.

In our copending application entitled "Preparation of Glycol Dicarbamates," filed November 15, 1956, Serial No. 622,279, it is disclosed that glycol dicarbamates may be made by the reaction of glycols and methyl carbamate in the presence of an aluminum alcoholate catalyst. It is also therein disclosed that the use of an inert solvent medium for the ester interchange reaction is generally desirable and that during the reaction period and the isolation of the product the temperature must be carefully controlled to avoid damage to the product.

In the preparation of carbamate esters by the reaction of alcohols with methyl carbamate (ester interchange) it is generally advantageous to use an amount of the latter reagent in excess of that theoretically required in order to achieve higher conversion of the alcohol reagent to carbamate. When this is done, however, it is then necessary to seaparate and recover the excess methyl carbamate. In the production of glycol dicarbamates this recovery step is complicated by several factors. In the first place, the glycol dicarbamates are in general sensitive to heat and if heated above about 135° are subject to secondary reactions resulting in lower yields and less purity of the desired products. In the second place, the glycol dicarbamates have a strong affinity for methyl carbamate, thus making difficult the distillation of the latter from a mixture of the two. In the third place, methyl carbamate has a high freezing point (54° C.), in consequence of which any attempt to distill it at low pressure (and low still-pot temperature) results in its solidification in the condenser of the still. It is apparent from these circumstances that if one attempts to distill methyl carbamate from a reaction mixture containing a glycol carbamate, the still-pot cannot be heated above about 135° C. and that at this temperature the methyl carbamate is not completely removed unless the pressure is reduced so far that the distillate solidifies in the condenser.

According to the invention, the above dilemma is solved by conducting the ester interchange reaction in the presence of an inert solvent that forms a binary azeotrope with methyl carbamate and, when the reaction is complete, removing the residual methyl carbamate from the reaction mixture by distilling said azeotrope.

While many substances distill azeotropically with methyl carbamate, to be useful in our process the substance must be a liquid that is a solvent for and is chemically inert toward each component of the reaction mixture under reaction conditions. Moreover, it must form a binary azeotrope with methyl carbamate that contains a substantial percentage of the latter. A final preferred, though not essential characteristic is that the azeotropic composition, upon being cooled to about room temperature, should readily deposit all or most of its methyl carbamate in crystalline form so that the solvent may be readily separated therefrom and recycled in the process.

We have found that those solvents boiling in the range of about 130° to 200° C. are preferred, since those boiling below about 130° form azeotropes containing only small percentages of methyl carbamate while those boiling above about 200° are generally difficult to remove completely from the glycol dicarbamate.

In the practice of the invention, the ester interchange reaction is conducted in the solvent medium preferably with continuous distillation of the methanol liberated in the reaction, after which the pressure is adjusted, if necessary, so that the azeotrope can be distilled without heating the reaction mixture sufficiently to harm the product. When all methyl carbamate has been thus removed from the reaction mixture, the remaining solvent can be distilled, suitably under reduced pressure, thus leaving the desired product as a still residue that can be purified by any suitable means. The azeotrope distillate may be separated into its components by any suitable means, such as crystallization of the methyl carbamate, or it may be recycled in the process without separation.

The practice of the invention is illustrated by the following examples.

Example 1

Into a flask fitted with a stirrer, thermometer well and 15-inch Vigreux column was put a solution of 0.3 mole of 2-methyl-2-propyl-1,3-propanediol, 0.63 mole of methyl carbamate and 5 g. of aluminum isopropoxide in 200 cc. of o-dichlorobenzene. The pressure was adjusted to 200 mm. and the mixture was refluxed for 10 hrs., its temperature being 116 to 119° C. Methanol was distilled as rapidly as it was formed. At the end of the reaction period the azeotrope mixture of methyl carbamate and o-dichlorobenzene was distilled under 100 mm. pressure until all residual carbamate had been removed from the reaction mixture. The azeotrope contained about 20 percent of methyl carbamate, most of which crystallized upon cooling the distillate.

After distillation of the azeotrope, the remaining o-dichlorobenzene was distilled, the pressure being lowered to 50 mm. To the residue was added 200 cc. of water, after which it was steam distilled until the distillate was no longer cloudy. Then 25 cc. of 5 N HCl and 75 cc. of isopropyl alcohol were added and the mixture was heated to boiling and poured onto 700 g. of cracked ice. The product thus precipitated was collected by filtration, washed with cold water and dried. It was a crystalline solid having a melting point of 100°–102° C. The yield was 73.5 percent of theory.

The methyl carbamate that crystallized from the azeotrope was quite pure and entirely suitable for recycling in the process. Likewise the liquid phase of the azeotrope, containing a small percentage of methyl carbamate, was suitable for reuse in the process without further treatment.

Example 2

Into a flask fitted with a stirrer, thermometer and 15-inch Vigreux column was put a solution of 0.3 mole of 2-methyl-2-propyl-1,3-propanediol and 0.66 mole of methyl carbamate in 190 cc. of bis (2-chloroethyl)ether. After distilling off about 15 cc. of solvent at 200 mm. to remove traces of water, 5 g. of aluminum isopropoxide was added to the reaction mixture. Heating was resumed and the reaction was run for 6 hours at a pressure of 185 mm. and a pot temperature of 133–134° C. The theoretical amount of methyl alcohol was collected as distillate in this length of time. At the end of the reaction period, the azeotrope mixture of methyl carbamate and bis-(2-chloroethyl) ether was distilled under 100 mm. pressure until all residual carbamate had been removed from the reaction mixture. The azeotrope contained about 20 percent of methyl carbamate, most of which crystallized upon cooling the distillate. After distillation of the azeotrope, the reaction residue was worked up as in Example 1 to give a crystalline solid with M.P. 99–102° C. The yield of 2-methyl-2-propyl-1,3-propanediol dicarbamate was 81.0 percent of theory.

*Example 3*

In an apparatus similar to that used in the preceding example, a mixture of 0.3 mole of 2-methyl-2-propyl-1,3-propanediol, 0.66 mole of methyl carbamate and 175 cc. of chlorobenzene was distilled at atmospheric pressure to remove traces of water. Then 3.5 g. of aluminum isopropoxide was added, and the mixture heated at a pot temperature of 132° C. for 12 hours. Based on the amount of methyl alcohol collected, the reaction was essentially complete in 8 hours. Then the excess methyl carbamate was removed at atmospheric pressure as an azeotrope with chlorobenzene, which azetrope contains about 6 percent by weight of methyl carbamate. The reaction residue was worked up in the usual manner to give 0.234 mole of 2-methyl-2-propyl-1,3-propanediol dicarbamate with M.P. 98–102° C. The yield was 78 percent of theory.

*Example 4*

A charge of 1000 lb. of 2-methyl-2-propyl-1,3-propanediol, 1310 lb. of methyl carbamate, 5400 lb. of chlorobenzene and 80 lb. of aluminum isopropoxide was placed in a kettle reactor fitted with stirrer and fractionating column and heated for 16 hours at 129–134° C. (reflux temperature), during which time methanol was distilled from the reactor as fast as it was formed.

At the end of the reaction period the excess methyl carbamate was removed by distillation of its azeotrope with chlorobenzene. The remaining chlorobenzene was then distilled, vacuum being applied in the final stages. In none of these operations was the temperature of the reaction mixture allowed to go above 134° C.

The last traces of chlorobenzene were removed from the product by steam distillation, after which the solid residue was dissolved in hot aqueous isopropyl alcohol. Upon cooling this solution the 2-methyl-2-propyl-1,3-propanediol dicarbamate was obtained as a crystalline precipitate which was isolated by filtration. Yield, 1220 lb., 74 percent of theory; melting point 101–103° C.

Results substantially equivalent to those obtained in the above examples are achieved when the glycols used in the examples are replaced with other glycols wherein at least one carbon atom separates the carbon atoms bearing the hydroxyl groups. 1,2-glycols generally give poor results because of the pronounced tendency for the formation of the cyclic carbamates (oxazolidones). In fact, the process is generally applicable to the production of higher carbamates and is not limited to glycol carbamates. In the production of higher carbamates, such as for instance, amyl, octyl or benzyl carbamate, the products do not have the heat-sensitivity of the glycol carbamates and hence it is practicable to distill the excess methyl carbamate from the reaction mixture without the use of an azeotroping agent.

Likewise, the particular solvents used in the above examples may be replaced with other inert solvents that form binary azeotropes with methyl carbamate. Among such suitable solvents are p-dibromobenzene, iodobenzene, p-bromotoluene, mesitylene, isobornyl methyl ether, cymene and gamma-terpinene.

We claim:

1. A process for producing a glycol dicarbamate comprising forming a reaction mixture comprising a glycol wherein at least one carbon atom separates the carbon atoms bearing the hydroxyl groups, methyl carbamate, an aluminum alcoholate and a liquid organic solvent selected from the group consisting of o-dichlorobenzene, bis(2-chloroethyl) ether, chlorobenzene, p-dibromobenzene, iodobenzene, p-bromotoluene, mesitylene, isobornyl methyl ether, cymene, and gamma-terpinene; heating said reaction mixture at reaction temperature to effect substantial reaction, distilling said binary azeotrope from the reaction mixture until substantially all residual methyl carbamate is removed from the reaction mixture and isolating the thus produced glycol dicarbamate from the reaction mixture.

2. A process as in claim 1 wherein the glycol is a 1,3-propanediol.

3. A process as in claim 1 wherein the glycol is 1,3-propanediol.

4. A process as in claim 1 wherein the glycol is 2-methyl-2-propyl-1,3-propanediol.

5. A process as in claim 1 wherein the solvent is o-dichlorobenzene.

6. A process as in claim 1 wherein the solvent is bis-(2-chloroethyl) ether.

7. A process as in claim 1 wherein the solvent is chlorobenzene.

8. A process as in claim 1 wherein the solvent is cymene.

9. A process as in claim 1 wherein the solvent is gamma-terpinene.

References Cited in the file of this patent

UNITED STATES PATENTS

| | | |
|---|---|---|
| 2,131,362 | Baldwin | Sept. 27, 1938 |
| 2,197,479 | Meigs | Apr. 16, 1940 |
| 2,226,202 | Hill et al. | Dec. 24, 1940 |
| 2,433,866 | Rehberg et al. | Jan. 6, 1948 |

FOREIGN PATENTS

| | | |
|---|---|---|
| 565,319 | Germany | Dec. 1, 1932 |

OTHER REFERENCES

Rehberg: Chem. Abstracts, vol. 41, p. 705 (1947).

Weissberger: Technique of Org. Chem., vol. IV (Distillation), particularly p. 363 (1951).

Groggins: Unit Processes in Org. Syn., pp. 616–619 (1952).